United States Patent
Yokoyama et al.

(10) Patent No.: US 10,026,950 B2
(45) Date of Patent: Jul. 17, 2018

(54) PRISMATIC SECONDARY BATTERY HAVING SPARK PREVENTION MECHANISM AND BATTERY PACK USING THE SAME

(71) Applicants: SANYO Electric Co., Ltd., Osaka (JP); TOYOTA JIDOSHA KABUSHIKI KAISHA, Toyota-shi, Aichi-ken (JP)

(72) Inventors: Yoshinori Yokoyama, Osaka (JP); Naoya Tada, Osaka (JP); Yasuhiro Yamauchi, Osaka (JP); Toshihiro Takada, Toyota (JP); Hiroshi Inukai, Toyota (JP); Yasushi Tsuchida, Toyota (JP); Takashi Tokunaga, Toyota (JP); Akira Kiyama, Toyota (JP)

(73) Assignees: SANYO ELECTRIC CO., LTD., Osaka (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 176 days.

(21) Appl. No.: 14/969,953

(22) Filed: Dec. 15, 2015

(65) Prior Publication Data
US 2016/0181589 A1 Jun. 23, 2016

(30) Foreign Application Priority Data

Dec. 19, 2014 (JP) .................. 2014-257975

(51) Int. Cl.
*H01M 2/34* (2006.01)
*H01M 10/04* (2006.01)
(Continued)

(52) U.S. Cl.
CPC ............ *H01M 2/345* (2013.01); *H01M 2/22* (2013.01); *H01M 2/263* (2013.01); *H01M 2/30* (2013.01);
(Continued)

(58) Field of Classification Search
None
See application file for complete search history.

(56) References Cited

U.S. PATENT DOCUMENTS

2008/0038627 A1 2/2008 Yamauchi et al.
2008/0038628 A1 2/2008 Yamauchi et al.
(Continued)

FOREIGN PATENT DOCUMENTS

JP 200866255 A 3/2008
JP 2008066254 A 3/2008
(Continued)

*Primary Examiner* — Lucas J. O'Donnell
(74) *Attorney, Agent, or Firm* — Muncy, Geissler, Olds & Lowe, P.C.

(57) ABSTRACT

A prismatic secondary battery of one configuration has a current disconnection mechanism, and a distance from a first conductive member to a second conductive member along a surface of a first insulation member and passing an outer periphery of the first insulation member is greater than or equal to 2.4 mm. At least one of the first insulation member and a second insulation member is formed from a material having a weight reduction percentage of 100% in thermo gravimetric measurement under conditions of a measurement temperature of 25° C.-600° C., a temperature increase rate of 5° C.±0.5° C./min, a measurement atmosphere of inert gas flow, and an amount of measurement sample of 10 mg±5 mg.

14 Claims, 7 Drawing Sheets

(51) Int. Cl.
    *H01M 2/30*     (2006.01)
    *H01M 2/22*     (2006.01)
    *H01M 2/26*     (2006.01)

(52) U.S. Cl.
    CPC .... *H01M 10/0431* (2013.01); *H01M 2200/20* (2013.01)

(56) References Cited

U.S. PATENT DOCUMENTS

| | | |
|---|---|---|
| 2010/0233529 A1 | 9/2010 | Nansaka et al. |
| 2013/0067727 A1 | 3/2013 | Nansaka et al. |
| 2013/0067728 A1 | 3/2013 | Nansaka et al. |
| 2013/0095352 A1 | 4/2013 | Yamauchi et al. |
| 2013/0196220 A1* | 8/2013 | Okutani .............. H01M 2/0217 429/179 |

FOREIGN PATENT DOCUMENTS

| | | |
|---|---|---|
| JP | 2010212034 A | 9/2010 |
| JP | 2013175428 A | 9/2013 |

* cited by examiner

PRISMATIC SECONDARY BATTERY HAVING SPARK PREVENTION MECHANISM AND BATTERY PACK USING THE SAME

PRIORITY INFORMATION

This application claims priority to Japanese Patent Application No. 2014-257975, filed on Dec. 19, 2014, which is incorporated herein by reference in its entirety.

BACKGROUND

Technical Field

The present invention relates to a prismatic secondary battery having a current disconnection mechanism and a battery pack which uses the prismatic secondary battery.

Related Art

Secondary batteries such as lithium ion secondary batteries are used in driving power sources of electric vehicles (EV) and hybrid electric vehicles (HEV, PHEV), and stationary storage battery systems used for inhibiting output fluctuation of solar light power generation, wind power generation, or the like, or for peak shift of system power for storage of electric power during the night and usage of the power during daytime. In the EV, HEV, or PHEV usage or in a stationary storage battery system, properties of high capacity and high power are desired. Therefore, a size of the individual battery is increased, and a large number of batteries are connected in series or in parallel for use.

For the batteries used for these usages, in particular, when a non-aqueous electrolytic secondary battery is used, a material having a very high reactivity is used, and thus, a degree of safety which is much higher compared to the secondary battery used in small-size, portable devices is required. Because of this, in prismatic secondary batteries used in the above-described usages, a current disconnection mechanism that disconnects electric connection between an external terminal and an electrode structure when a pressure in a battery outer structure is increased is provided, as described in, for example, JP 2008-66254 A, JP 2008-66255 A, JP 2010-212034 A, and JP 2013-175428 A.

The present inventors have found, in development of high-power, high-capacity battery packs, that in a battery pack in which the number of prismatic secondary batteries connected in series is increased and a total voltage of the battery pack is greater than or equal to 100 V, there is a possibility that, after the current disconnection mechanism is activated, spark may be generated inside the prismatic secondary battery, which may then damage the outer structure or the like of the prismatic secondary battery. The present invention resolves such a problem, and in particular, provides a prismatic secondary battery in which damage to battery constituting components, in particular, the outer structure of the battery, by the spark or the like after the current disconnection mechanism is activated, is prevented.

The present inventors have searched for the cause of the spark generated inside the battery after the current disconnection mechanism is activated, and found that the cause of the spark is as follows.

When the prismatic secondary battery is excessively charged, gas is generated inside the battery, and an inner pressure of the battery is increased. The current disconnection mechanism is then activated, and the electric connection between a first conductive member and a second conductive member of the current disconnection mechanism is cut off. Then, when a large voltage is applied to the prismatic secondary battery in a state where the electrolytic solution is adhered to a surface of an insulation member of the current disconnection mechanism, a current flows in a route from the first conductive member of the current disconnection mechanism, to electrolytic solution on the surface of the insulation member of the current disconnection mechanism, and further to the second conductive member of the current disconnection mechanism. Because the electrical resistance of this route is very high, when current flows in this route, heat is generated, the temperature of the insulation member surface is further increased by electrolysis of the electrolytic solution, the surface of the insulation member or the electrolytic solution existing on the surface of the insulation member is carbonized (in particular, carbonization of the surface of the insulation member has significant influence), and the route becomes a conductive route of a lower resistance. A spark is then generated partway in the conductive route.

SUMMARY

According to one aspect of the present invention, there is provided a prismatic secondary battery comprising: an electrode structure including a positive electrode plate and a negative electrode plate; a prismatic outer structure that has an opening and that stores the electrode structure and an electrolytic solution; a sealing structure that has a through hole and that seals the opening; an external terminal that is inserted into the through hole and is electrically connected to the electrode structure; a first conductive member that is placed between the sealing structure and the electrode structure and that has a tubular portion having an opening formed on an end on the electrode structure side; an inversion plate that seals the opening of the first conductive member; a second conductive member that is placed on a side closer to the electrode structure than is the inversion plate and that is electrically connected to the inversion plate; a first insulation member that is placed between the inversion plate and the second conductive member; and a second insulation member that is placed between the sealing structure and the first conductive member, wherein a distance from the first conductive member to the second conductive member along a surface of the first insulation member and passing an outer periphery of the first insulation member is greater than or equal to 2.4 mm, at least one of the first insulation member and the second insulation member is formed from a material having a weight reduction percentage of 100% at a thermo gravimetric measurement under conditions of a measurement temperature of 25° C.-600° C., a temperature increase rate of 5° C.±0.5° C./min, a measurement atmosphere of an inert gas flow, and an amount of measurement sample of 10 mg±5 mg, and the inversion plate is deformed when a pressure in the prismatic outer structure becomes greater than or equal to a predetermined value, to disconnect a conductive route between the electrode structure and the external terminal.

Preferably, the first insulation member is formed from a material which is 100% gasified at a temperature of greater than or equal to 600° C., and more preferably, the first insulation member and the second insulation member are formed from a material which is 100% gasified at a temperature of greater than or equal to 600° C.

Preferably, the first insulation member has a first body placed between the inversion plate and the second conductive member, and a pair of first side wall portions extending from both ends in a width direction of the first body in a direction toward the sealing structure.

Preferably, the second insulation member has a second body placed between the sealing structure and the first conductive member, and a pair of second side wall portions extending from both ends in a width direction of the second body toward the electrode structure side, and the pair of the first side wall portions and the pair of the second side wall portions are respectively connected to each other.

Preferably, a tracking index of the surface of the first insulation member is greater than or equal to 600 V in terms of CTI value.

Preferably, the first insulation member is formed from a member selected from a group consisting of polypropylene, perfluoroalkoxy fluoroplastic, and copolymer of ethylene-tetrafluoroethylene.

Preferably, the electrode structure is a flat wound electrode structure in which the positive electrode plate and the negative electrode plate are wound with a separator therebetween, a wound positive electrode core exposing portion is formed on one end in a winding axis direction of the wound electrode structure, a wound negative electrode core exposing portion is formed on the other end in the winding axis direction of the wound electrode structure, a positive electrode electricity collector structure is connected to the wound positive electrode core exposing portion, a negative electrode electricity collector structure is connected to the wound negative electrode core exposing portion, and the second conductive member is at least one of the positive electrode electricity collector structure and the negative electrode electricity collector structure.

Preferably, the first conductive member has a circular shape in a plan view.

Preferably, a battery pack according to another aspect of the present invention is a battery pack in which 50 or more of the prismatic secondary batteries described above are connected in series, wherein the prismatic secondary battery is a non-aqueous electrolytic secondary battery.

According to a prismatic secondary battery of one aspect of the present invention, by employing a configuration wherein the distance from the first conductive member to the second member along a surface of the first insulation member and passing an outer periphery of the first insulation member is greater than or equal to 2.4 mm, and at least one of the first insulation member and the second insulation member is formed from a material having a weight reduction percentage of 100% in terms of a thermo gravimetric measurement, it is possible to prevent generation of sparks inside the battery after the current disconnection mechanism is activated. When the insulation member is formed from a material which is gasified at a high temperature, carbonization of the surface of the insulation member can be inhibited, it becomes difficult for a low-resistance conductive route along the surface of the insulation member to be formed, and the generation of the sparks can be inhibited. The prismatic secondary battery of one aspect of the present invention is particularly effective when the prismatic secondary battery is a non-aqueous electrolytic secondary battery having a non-aqueous electrolyte. As materials forming the non-aqueous electrolytic secondary battery, known materials may be used.

DESCRIPTION OF EXEMPLARY EMBODIMENTS

A preferred embodiment of the present invention will now be described in detail. The description of the preferred embodiment is not, however, intended to limit the present invention to the preferred embodiment.

Figure 1B:
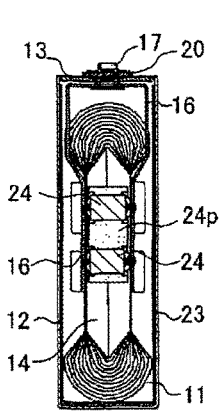
FIG. 1B is a cross sectional diagram along an IB-IB line of FIG. 1A.
Figure 1A:
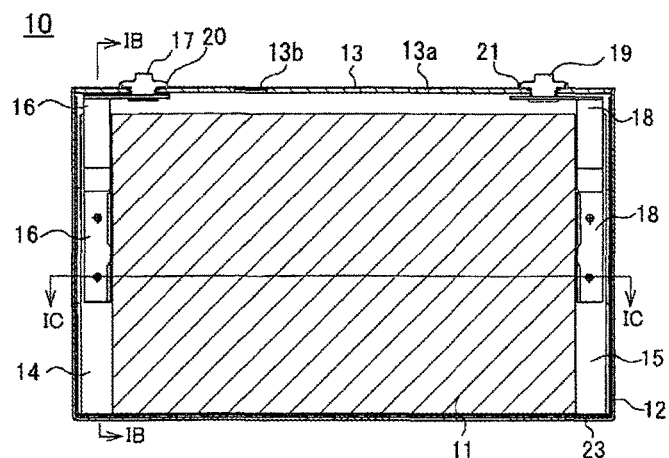
FIG. 1A is cross sectional diagram of a prismatic secondary battery according to a preferred embodiment of the present invention.
Figure 1C:
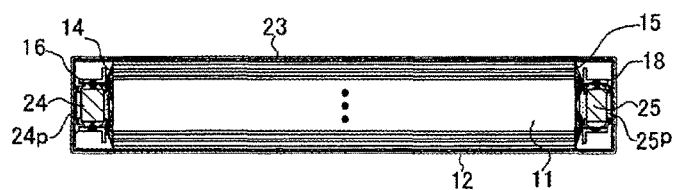
FIG. 1C is a cross sectional diagram along an IC-IC line of FIG. 1A.

First, a prismatic secondary battery 10 according to the present embodiment will be described with reference to FIGS. 1A-1C. As shown in FIGS. 1A-1C, the prismatic secondary battery 10 comprises a wound electrode structure 11 which is an electrode structure including a positive electrode plate and a negative electrode plate, and a prismatic outer structure 12 which stores the wound electrode structure 11 and an electrolytic solution (for example, non-aqueous electrolytic solution containing lithium salt). The wound electrode structure 11 is, for example, a flat electrode structure in which the positive electrode plate and the negative electrode plate are wound with a separator (not shown) therebetween. The prismatic outer structure 12 has an opening, and the prismatic secondary battery 10 has a sealing structure 13 which seals the opening. On the sealing structure 13, a positive electrode external terminal 17 and a negative electrode external terminal 19 are provided. In the present embodiment, while in a state where the external terminals are respectively inserted into two through holes (terminal insertion holes) formed in the sealing structure 13, the external terminals are fixed to the sealing structure 14 via gaskets 20 and 21, respectively.

The positive electrode plate is, for example, a structure in which a positive electrode active material mixture layer is formed on both surfaces of a positive electrode core made of an aluminum foil. As the positive electrode active material, a lithium-transition metal oxide or the like may be used. The positive electrode active material mixture layer preferably includes, in addition to the positive electrode active material, a bonding agent and a conductive member. The positive electrode plate has a positive electrode core exposing portion 14 on one end in a width direction. The negative electrode plate is, for example, a structure in which a negative electrode active material mixture layer is formed on both surfaces of a negative electrode core made of a copper foil. As the negative electrode active material, a carbon material to and from which lithium ions can be inserted and detached, a silicon compound, or the like may be used. The negative electrode active material mixture layer preferably includes, in addition to the negative electrode active material, a bonding agent. The negative electrode plate has a negative electrode core exposing portion 15 on one end in a width direction. In the wound electrode structure 11, the wound positive electrode core exposing portion 14 is positioned on one end of the winding axis of the wound electrode structure 11, and the wound negative electrode core exposing portion 15 is positioned on the other end.

A positive electrode electricity collector structure 16 which is a second conductive member is connected to the wound positive electrode core exposing portion 14. A positive electrode connection member 24 made of a metal and held by a positive electrode resin member 24p is placed at a center portion of the wound positive electrode core exposing portion 14, and the positive electrode electricity collector structure 16, the positive electrode core exposing portion 14, and the positive electrode connection member 24 are integrally welded and connected. The positive electrode electricity collector structure 16 is electrically connected to the positive electrode external terminal 17 via an inversion plate 33 to be described later, or the like. A negative electrode electricity collector structure 18 is connected to the wound negative electrode core exposing portion 15. A negative electrode connection member 25 made of a metal and held by a negative electrode resin member 25p is placed at a center portion of the wound negative electrode core exposing portion 15, and the negative electrode electricity collector structure 18, the negative electrode core exposing portion 15, and the negative electrode connection member 25 are integrally welded and connected. The negative electrode electricity collector structure 18 is electrically connected to the negative electrode external terminal 19. On a conductive route between the positive electrode plate and the positive electrode external terminal 17, a current disconnection mechanism which is activated when a pressure inside the prismatic outer structure 12 made of a metal becomes greater than or equal to a predetermined value and which disconnects the conductive route between the positive electrode plate and the positive electrode external terminal 17 is provided. The positive electrode external terminal 17 and the negative electrode external terminal 19 are fixed to the sealing structure 13 made of a metal via gaskets 20 and 21, respectively.

The flat wound electrode structure 11 is placed in the prismatic outer structure 12 in a state where an insulating resin sheet 23 is interposed around the electrode structure 11 except for the side of the sealing structure 13. As described above, the prismatic outer structure 12 has an opening, and the opening of the prismatic outer structure 12 is sealed by the prismatic outer structure 12 and the sealing structure 13 being welded together. A gas discharge valve 13b which is opened when a gas pressure higher than an activation pressure of the current disconnection mechanism is applied is provided on the sealing structure 13. In addition, an electrolytic solution injection hole 13a is provided on the sealing structure 13.

Next, the current disconnection mechanism will be described with reference to FIGS. 2-4. In the following, the current disconnection mechanism on the positive electrode side will be described, but alternatively, the current disconnection mechanism may be provided on the negative electrode side or on both the positive electrode side and the negative electrode side. In addition, the positive electrode electricity collector structure 16 will be exemplified as the second conductive member, but alternatively, another conductive member may be provided between the positive electrode electricity collector structure 16 and the inversion plate 33, serving as the second conductive member.

Figure 2A:
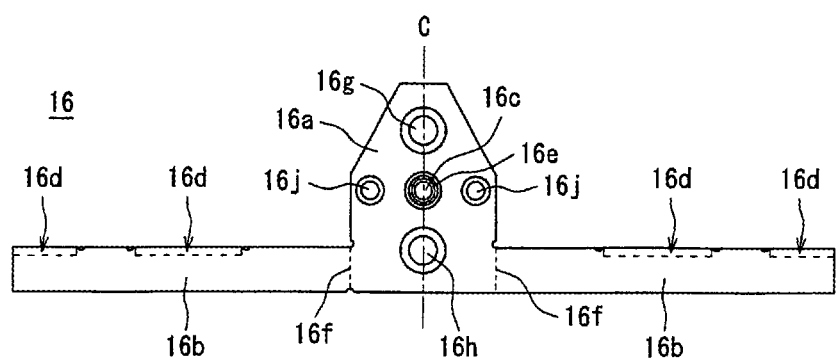
FIG. 2A is a front view expanding a positive electrode electricity collector structure of the prismatic secondary battery of FIGS. 1A-1C.
Figure 2B:
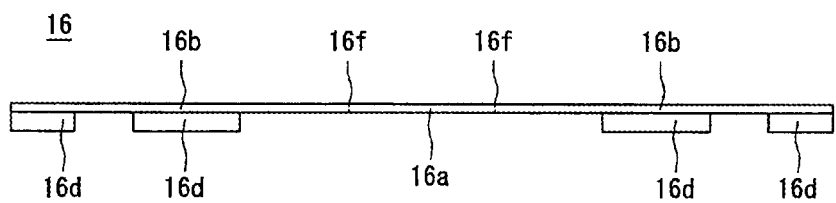
FIG. 2B is a side view expanding the positive electrode electricity collector structure of the prismatic secondary battery of FIGS. 1A-1C.

As shown in FIGS. 2A and 2B, the positive electrode electricity collector structure 16 has a first region 16a placed in parallel to the sealing structure 13, and a pair of second regions 16b extending from the first region 16a in directions opposite from each other, folded at a broken line portion (boundary portion 16f), and extending in the direction of the wound electrode structure 11. The second region 16b is welded and connected to the positive electrode core exposing portion 14. In the second region 16b, a rib 16d is formed on an end in a width direction of a region to be welded and connected to the positive electrode core exposing portion 14.

In the first region 16a of the positive electrode electricity collector structure 16, a connection portion forming hole 16c is formed at a center portion. A first open hole 16g and a second open hole 16h are respectively formed on a center line c passing through a center of the connection portion forming hole 16c and along a long-side direction of the sealing structure 13 and on both sides of the connection portion forming hole 16c. Two third open holes 16j are formed on both sides of the connection portion forming hole 16c in a direction perpendicular to the center line c. A peripheral portion of the connection portion forming hole 16c in the first region 16a is set as a thin-thickness region 16e in which the thickness of an annular shape is set thinner compared to other portions.

Figure 3:
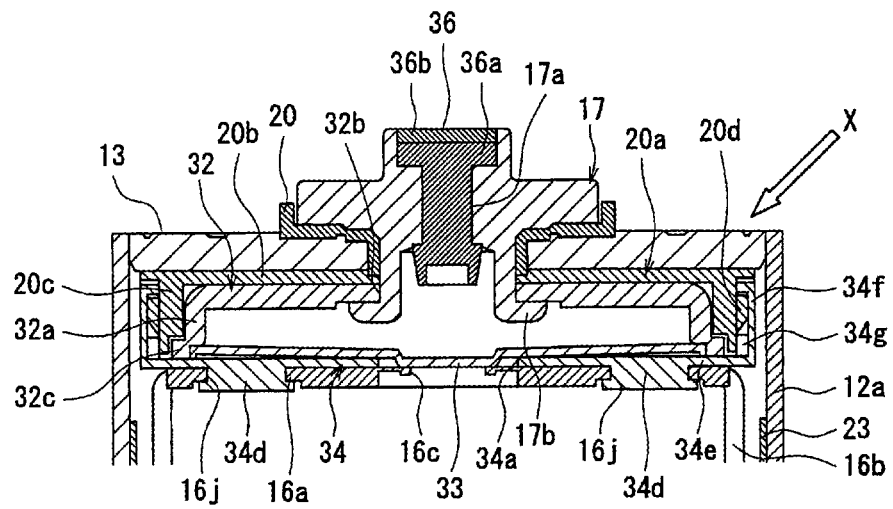
FIG. 3 is a cross sectional diagram, in a short-side direction of a prismatic outer structure, of a current disconnection mechanism provided on a positive electrode side of the prismatic secondary battery of FIG. 1.
Figure 4:
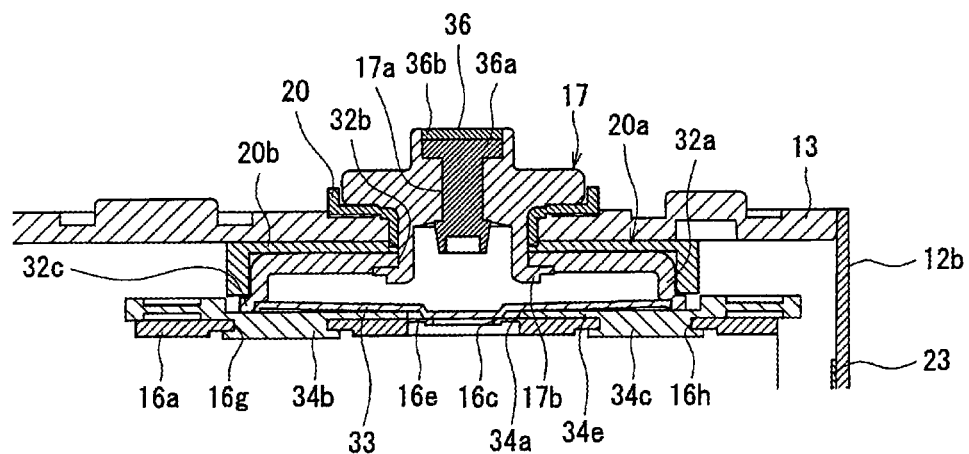
FIG. 4 is a cross sectional diagram, in a long-side direction of the prismatic outer structure, of the current disconnection mechanism provided on the positive electrode side of the prismatic secondary battery of FIG. 1.

As shown in FIGS. 3 and 4, the prismatic secondary battery 10 comprises a first conductive member 32 placed between the sealing structure 13 and the wound electrode structure 11 and electrically connected to the positive electrode external terminal 17, and a second insulation member 20a placed between the sealing structure 13 and the first conductive member 32. The first conductive member 32 has a tubular portion 32a having an opening formed on an end on the side of the wound electrode structure 11. Further, the prismatic secondary battery 10 has an inversion plate 33 which seals the opening of the tubular portion 32a of the first conductive member, and a first insulation member 34 placed between the inversion plate 33 and the positive electrode electricity collector structure 16 which is the second conductive member. The positive electrode electricity collector structure 16 is provided on a side closer to the wound electrode structure 11 than the inversion plate 33, and is electrically connected to the inversion plate 33. As will be described in detail later, the inversion plate 33 expands and is deformed towards the side of the sealing structure 13 when a pressure in the prismatic outer structure 12 becomes greater than or equal to a predetermined value. With this process, the electrical connection between the inversion plate 33 and the positive electrode electricity collector structure 16 is disconnected, and the conductive route between the wound electrode structure 11 and the positive electrode external terminal 17 is disconnected.

In the positive electrode external terminal 17, a through hole 17a is formed. The positive electrode external terminal 17 is inserted into holes formed respectively in the gasket 20, the sealing structure 13, the second insulation member 20a, and the first conductive member 32 having the tubular portion 32a, and a tip portion 17b thereof is caulked to integrally fix the positive electrode external terminal 17. The through hole 17a is sealed by a terminal stopper 36. The terminal stopper 36 includes an elastic portion 36a made of rubber and a metal plate 36b made of aluminum.

The tubular portion 32a having the opening on the side of the wound electrode structure 11 is formed on the first conductive member 32, and the side of the sealing structure 13 has the inner diameter narrowed, to form an open hole 32b into which the positive electrode external terminal 17 is inserted. The tip 17b of the positive electrode external terminal 17 is caulked near the open hole 32b of the first conductive member 32, and the tip 17b of the positive electrode external terminal 17 and the connection portion of the first conductive member 32 are laser-welded.

On a tip of the tubular portion 32a of the first conductive member 32 on the side of the wound electrode structure 11, a flange portion 32c is formed. On an inner surface side of the flange portion 32c, a periphery of the inversion plate 33 made of a metal is airtightly welded and sealed. The first region 16a of the positive electrode electricity collector structure 16 is brought in to contact with a center portion of the inversion plate 33, and an inner wall portion of the connection portion forming hole 16c of the thin-thickness region 16e formed in the first region 16a and the surface of the inversion plate 33 are laser-welded at a plurality of locations.

The first insulation member 34 having a first through hole 34a and made of a resin material is place between the first region 16a of the positive electrode electricity collector structure 16 and the inversion plate 33. The first region 16a of the positive electrode electricity collector structure 16 and the inversion plate 33 are electrically connected to each other via the first through hole 34a. At the periphery of the first through hole 34a of the first insulation member 34, a first protrusion 34b is formed at a position, of the first region 16a of the positive electrode electricity collector structure 16, corresponding to the first open hole 16g, a second protrusion 34c is formed at a position corresponding to the second open hole 16h, and a third protrusion 34d is formed at a position corresponding to the third open hole 16j.

The first through third protrusions 34b-34d of the first insulation member 34 are respectively inserted into the first through third open holes 16g-16j formed in the first region 16a of the positive electrode electricity collector structure 16, and tips of the first through third protrusions 34b-34d are heated and enlarged in diameter, to fix the first insulation member 34 and the first region 16a of the positive electrode electricity collector structure 16 to each other.

The positive electrode core exposing portion 14 is electrically connected to the positive electrode external terminal 17 via the second region 16b of the positive electrode electricity collector structure 16, the first region 16a and the thin-thickness region 16e of the positive electrode electricity collector structure 16, the inversion plate 33, and the first conductive member 32. Here, the current disconnection mechanism of the present embodiment is formed by the tubular portion 32a of the first conductive member 32, the inversion plate 33, the first insulation member 34, and the thin-thickness region 16e formed in the first region 16a of the positive electrode electricity collector structure 16.

The inversion plate 33 is configured to be deformed toward the side of the positive electrode external terminal 17 when the pressure in the prismatic outer structure 12 is increased to a value greater than or equal to a predetermined value. Because the thin-thickness region 16e of the first region 16a of the positive electrode electricity collector structure 16 is welded to the center portion of the inversion plate 33, when the pressure in the prismatic outer structure 12 exceeds the predetermined value, the first region 16a of the positive electrode electricity collector structure 16 is broken at the portion of the thin-thickness region 16e, and thus, the electrical connection between the inversion plate 33 and the first region 16a of the positive electrode electricity collector structure 16 is cut off.

[Along-Surface Distance from First Conductive Member 32, to Surface of First Insulation Member 34, and Further to Second Conductive Member (Positive Electrode Electricity Collector Structure 16)]

Figure 5A:
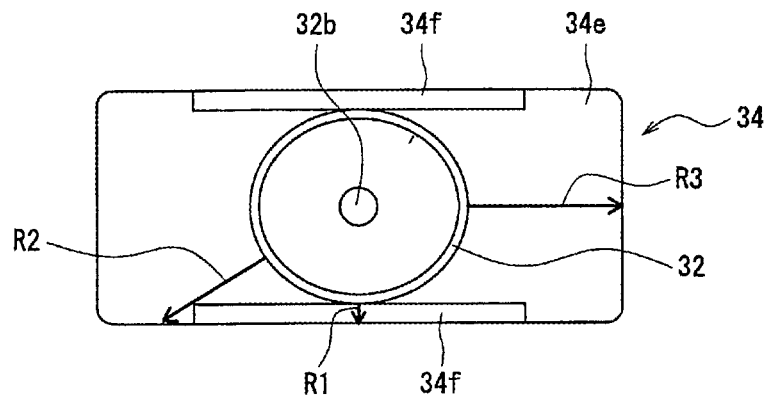
FIG. 5A is a plan view of a first insulation member and a first conductive member in the prismatic secondary battery of FIG. 1.
Figure 5B:
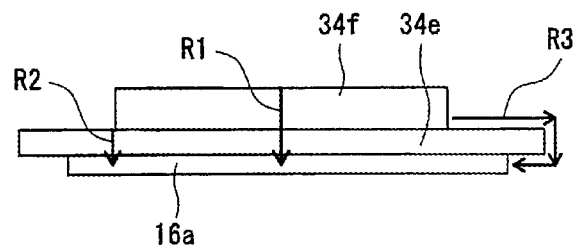
FIG. 5B is a side view of the first insulation member and the first conductive member in the prismatic secondary battery of FIG. 1.
Figure 6:
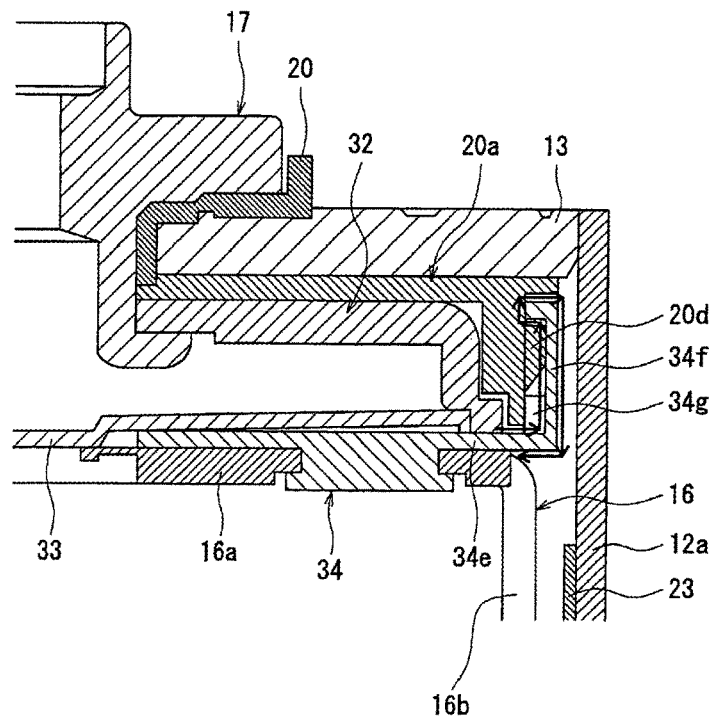
FIG. 6 is an enlarged view of an X portion in FIG. 3.

As shown in FIGS. 3 and 5, the first insulation member 34 has a first body 34e placed between the inversion plate 33 and the first region 16a of the positive electrode electricity collector structure 16, and a pair of first side wall portions 34f extending from both ends in a width direction of the first body 34e (both ends on the side of a large side wall portion 12a of the prismatic outer structure 12) in a direction toward the sealing structure 13. Therefore, as shown in FIG. 6, a distance from the first conductive member 32 to the positive electrode electricity collector structure 16 (second conductive member) along the surface of the first insulation member 34 and via an outer periphery of the first insulation member 34 can be set large.

In such a configuration, routes from the first conductive member 32 to the positive electrode electricity collector structure 16 along the surface of the first insulation member 34 and via the outer periphery of the first insulation member 34 include, for example, a route R1 (refer to FIGS. 5 and 6) from the first conductive member 32, along the surface of the first insulation member 34 and via an upper end of a first side wall portion 34f and the outer periphery of the first insulation member 34, a route R2 (refer to FIG. 5) from the first conductive member 32, along the surface of the first insulation member 34, detouring around an end in the longitudinal direction of the first side wall portion 34f, and via the outer periphery of the first insulation member 34, and a route R3 (refer to FIG. 5) from the first conductive member 32, along the surface of the first insulation member 34, and via a portion, of the outer periphery of the first insulation member 34, opposing a small side wall portion 12b of the prismatic outer structure 12. In the prismatic secondary battery 10, a length of the route R1 is 2.7 mm, a length of the route R2 is 3.5 mm, and a length of the route R3 is 8 mm. A shortest distance from the first conductive member 32 to the positive electrode electricity collector structure 16 (second conductive member) along the surface of the first insulation member 34 and via the outer periphery of the first insulation member 34 is 2.7 mm, which is the length of the route R1.

In this manner, when a configuration is employed in which the shortest distance from the first conductive member 32 to the positive electrode electricity collector structure 16 (second conductive member) along the surface of the first insulation member 34 and via the outer periphery of the first insulation member 34 is greater than or equal to 2.7 mm, after the current disconnection mechanism is activated, it becomes more difficult for the conductive route to be formed in the route from the first conductive member 32 to the surface of the first insulation member 34, and further to the second conductive member (positive electrode electricity collector structure 16). As will be described later, by using a material which is easily gasified without being carbonized at a high temperature for at least one of the first insulation member 34 and the second insulation member 20a, it becomes possible to prevent generation of sparks in the battery. Here, the shortest distance from the first conductive member 32 to the positive electrode electricity collector structure 16 (second conductive member) along the surface of the first insulation member 34 and via the outer periphery of the first insulation member 34 is preferably greater than or equal to 2.4 mm, more preferably, greater than or equal to 3.0 mm, and even more preferably, greater than or equal to 4.0 mm.

The distance from the first conductive member 32 to the positive electrode electricity collector structure 16 along the surface of the first insulation member 34 and via the outer periphery of the first insulation member 34 can be adjusted by changing a height of the first side wall portion 34f, a length of the first side wall portion 34f, and a thickness of the first side wall portion 34f, or the like. Alternatively, the distance may be adjusted by providing a projection-depression portion on the surface of the first insulation member 34.

In the prismatic secondary battery 10, because the first conductive member 32 is circular in the plan view, the distance of the route R2 can be set longer compared to a case where the first conductive member 32 has a quadrangular shape in the plan view.

Figure 7:
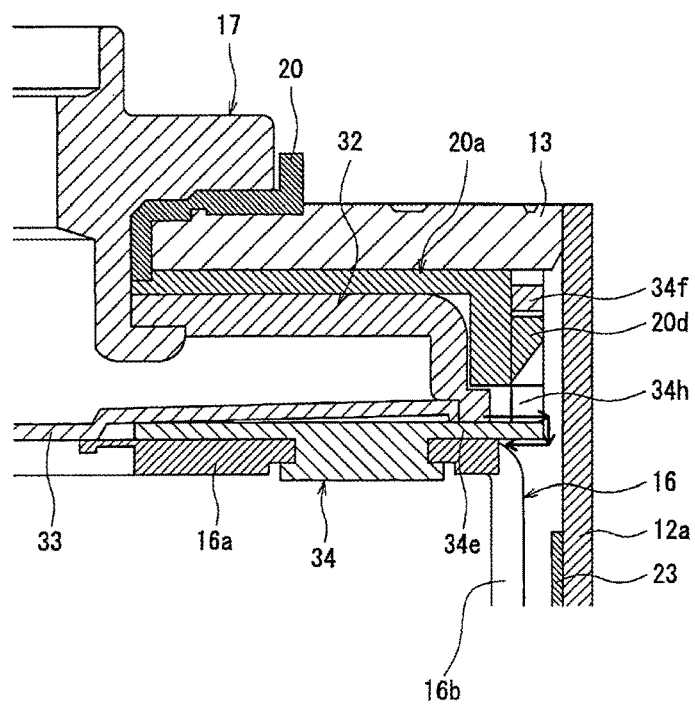
FIG. 7 is a diagram of a prismatic secondary battery according to an alternative configuration, corresponding to FIG. 6.

When the first insulation member 34 has the first side wall portion 34f, if the above-described along-surface distance is greater than or equal to 2.4 mm, a through hole 34h may be formed in the first side wall portion 34f as shown in FIG. 7. However, when the through hole 34h is formed in the first side wall portion 34f, the shortest distance from the first conductive member 32 to the positive electrode electricity collector structure 16 along the surface of the first insulation member 34 and via the outer periphery of the first insulation member 34 would become shorter, and thus, such a configuration is not preferable.

It is preferable to set a distance between the center portion of the inversion plate 33 and the thin-thickness region 16e of the positive electrode electricity collector structure 16 when the current disconnection mechanism is activated and the center portion of the inversion plate 33 moves to the side of the positive electrode external terminal 17 to be greater than or equal to 0.3 mm. With such a configuration, generation of sparks between the inversion plate 33 and the positive electrode electricity collector structure 16 after the current disconnection can be more reliably prevented.

[First Insulation Member]

In the prismatic secondary battery 10, it is preferable that a tracking index of the surface of the first insulation member 34 is greater than or equal to 600 V in terms of CTI value. With such a configuration, when a high voltage is applied to the prismatic secondary battery 10 after the current disconnection mechanism is activated, it becomes possible to more reliably prevent carbonization of the surface of the first insulation member 34 and consequent formation of the conductive route via the surface of the first insulation member 34. For the second insulation member 20a, similar to the first insulation member 34, the tracking index of the surface is preferably greater than or equal to 600 V in terms of CTI value. For the tracking index, a so-called CTI value defined in JIS is used. In order to inhibit carbonization of the surface of the first insulation member 34, the first insulation member 34 is preferably formed from a material which is 100% gasified at a temperature of greater than or equal to 600° C. The first insulation member 34 is formed from a material having a weight reduction percentage of 100% under a thermo gravimetric measurement (measurement temperature: 25° C.-600° C.; temperature increase rate: 5° C.±0.5° C./min; measurement atmosphere: inert gas flow; and amount of measurement sample: 10 mg±5 mg). For the inert gas, for example, nitrogen ($N_2$) is used, and the $N_2$ gas flow is 0.2 L/min. That is, the first insulation member 34 (measurement sample obtained from the first insulation member 34) has a weight reduction ratio of 100% when thermo gravimetric measurement (TG measurement) is executed under conditions of the measurement temperature of 25° C.-600° C., the temperature increase rate of 5° C.±0.5° C./min, the measurement atmosphere of inert gas flow, and the amount of measurement sample of 10 mg±5 mg. For the second insulation member 20a, similar to the first insulation member 34, the second insulation member 20a is preferably formed from a material having a weight reduction percentage of 100% in the above-described TG measurement.

The first insulation member 34 is preferably formed from a material selected from a group consisting of polypropylene (PP), perfluoroalkoxy fluoroplastic (PFA), and copolymer of ethylene-tetrafluoroethylene (PTFE). In particular, polypropylene is preferable. The second insulation member 20a is preferably formed from a material selected from a group consisting of polypropylene (PP), perfluoroalkoxy fluoroplastic (PFA), and copolymer of ethylene-tetrafluoroethylene (PTFE). In particular, polypropylene is preferable.

[Connection of First Insulation Member 34 and Second Insulation Member 20a]

As shown in FIG. 3, the second insulation member 20a has a second body 20b placed between the sealing structure 13 and the first conductive member 32, and a pair of second side wall portions 20c extending from both ends in a width direction of the second body 20b (both ends on the side of the large side wall portion 12a of the prismatic outer structure 12) toward the side of the electrode structure 11. Outer surfaces of the pair of second side wall portions 20c are placed to respectively oppose inner surfaces of the pair of the first side wall portions 34f of the first insulation member 34. In addition, a projection 20d is provided on the outer surfaces of the pair of the second side wall portions 20c, recesses 34g are provided on the inner surfaces of the pair of first side wall portions 34f, and the projection 20d and the recess 34g are fitted together to connect the first insulation member 34 and the second insulation member 20a. Alternatively, a projection may be provided on the first side wall portion 34f and a recess may be provided on the second side wall portion 20c.

[Connection of First Insulation Member 34 and First Conductive Member 32]

Preferably, a hook protruding toward the first conductive member 32 is provided on the first body 34e of the first insulation member 34, and is hooked on the flange portion 32c of the first conductive member 32, to fix the first insulation member 34 and the first conductive member 32 to each other.

Figure 8A:
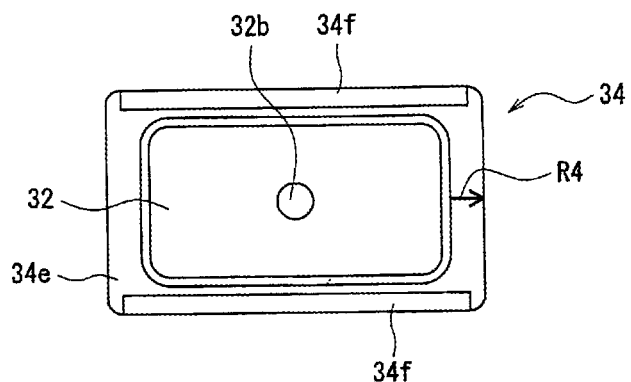
FIG. 8A is a plan view of a first insulation member and a first conductive member in the prismatic secondary battery of the alternative configuration.

In the above-described embodiment, a configuration is exemplified in which the shape of the tubular portion of the first conductive member in the plan view and the shape of the inversion plate in the plan view are circular, but alternatively, a configuration may be employed as shown in FIG. 8A, in which the shape of the tubular portion of the first conductive member in the plan view and the shape of the inversion plate in the plan view are approximately rectangular. In this case, the shortest route from the first conductive member 32 to the positive electrode electricity collector structure 16 along the surface of the first insulation member 34 and via the outer periphery of the first insulation member 34 is a route R4 (refer to FIG. 8) from the first conductive member 32, along the surface of the first insulation member 34 and via a portion, of the outer periphery of the first insulation member 34, opposing the small side wall portion 12b of the prismatic outer structure 12. Here, the route R4 has a length of 2.4 mm. Therefore, the shortest distance from the first conductive member 32 to the positive electrode electricity collector structure 16 (second conductive member) along the surface of the first insulation member 34 and via the outer periphery of the first insulation member 34 is 2.4 mm, and thus, the generation of sparks in the battery can be prevented.

<Others>

As described above, a reliable prismatic secondary battery can be obtained by setting the shortest distance from the first conductive member 32 to the second conductive member (positive electrode electricity collector structure 16) along the surface of the first insulation member 34 and via the outer periphery of the first insulation member 34 to a value greater than or equal to 2.4 mm. As a result of a further review by the present inventors, it has been found that there is still the following possibility of generation of sparks inside the battery after the current disconnection mechanism is activated.

After the current disconnection mechanism is activated, if a high voltage of few hundreds of volts is applied to the prismatic secondary battery in a state where a film of electrolytic solution exists on the surface of the first insulation member 34 or the second insulation member 20a, a conductive route may be formed from the positive electrode external terminal 17 or the first conductive member 32, to the electrolytic solution on the surface of the first insulation member 34 or the second insulation member 20a, and further to the sealing structure 13 and to the prismatic outer structure 12, and sparks may be generated between the large side wall portion 12a of the prismatic outer structure 12 and the positive electrode electricity collector structure 16 (second conductive member).

Figure 9:
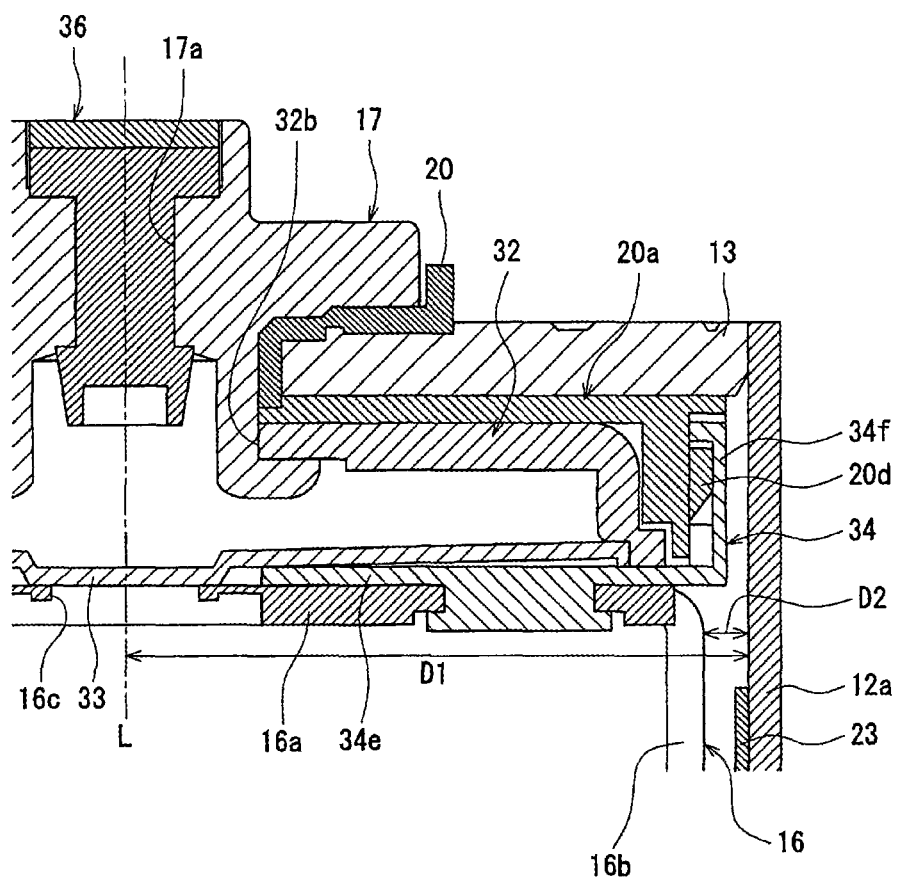
FIG. 9 is an enlarged view of an X part in FIG. 3.

In order to solve this problem, as shown in FIG. 9, it is preferable that, when a distance from a central axis L in the short-side direction of the prismatic outer structure 12 to the large side wall portion 12a of the prismatic outer structure 12 is D1 and the shortest distance of a portion, of the positive electrode electricity collector structure 16, directly opposing the large side wall portion 12a of the prismatic outer structure 12 without the insulation member such as the resin sheet 23 intervening therebetween is D2, a value of D2/D1 is set greater than or equal to 1/15. With such a configuration, generation of sparks between the large side wall portion 12a of the prismatic outer structure 12 and the positive electrode electricity collector structure 16 can be prevented. More preferably, the shortest distance D2 of the portion, of the positive electrode electricity collector structure 16, directly opposing the large side wall portion 12a of the prismatic outer structure 12 without an insulation member such as the resin sheet 23 intervening therebetween, is set greater than or equal to 1.0 mm. Preferably, the value of D2/D1 is set less than or equal to 1/10.

Alternatively, as another method of solving this problem, an insulation member may be provided between the first region 16a and a second region 16b in the vicinity of the first region 16a of the positive electrode electricity collector structure 16 which is the second conductive member and the side wall portion (in particular, the large side wall portion 12a) of the prismatic outer structure 12. For example, the resin sheet 23 covering the wound electrode structure 11 may be extended more toward an upper side (side of the sealing structure 13) than the positive electrode electricity collector structure 16.

Alternatively, an insulation sheet separate from the resin sheet 23 may be placed between the positive electrode electricity collector structure 16 and the side wall portion of the prismatic outer structure 12. In this case, preferably, one end side of the insulation sheet is sandwiched between the sealing structure 13 and the second insulation member 20a. In addition, a method of insulation-coating the inner surface of the prismatic outer structure 12 and a method of affixing an insulation member on the inner surface of the prismatic outer structure 12 may also be considered. Further, a method of insulation-coating the surface of the first region 16a or the second region 16b in the vicinity of the first region 16a of the positive electrode electricity collector structure 16 which is the first conductive member, and a method of affixing an insulation member on the surface of the first region 16a or the second region 16b in the vicinity of the first region 16a of the positive electrode electricity collector structure 16 may also be considered. As the insulation coating, a fluoride coating is preferable.

EXAMPLES

The present invention will now be described in more detail with reference to Examples, but it should be noted that the present invention is not limited to these Examples.

Example 1

[Production of Positive Electrode Plate]

90 weight % of a positive electrode active material ($LiNi_{0.35}Co_{0.35}Mn_{0.30}O_2$), 9 weight % of carbon black, and 2 weight % of polyvinylidene fluoride powder were mixed, and the mixture was mixed with N-methyl-2-pyrrolidone (NMP), to prepare a positive electrode mixture slurry. The slurry was applied on both surfaces of an aluminum foil serving as the positive electrode core, to form a positive electrode active material mixture layer. Then, the positive electrode active material mixture layer was compressed by a compression roller, to obtain a positive electrode plate.

[Production of Negative Electrode Plate]

98 weight % of a negative electrode active material (graphite), 1 weight % of copolymer of styrene-butadiene, and 1 weight % of carboxymethylcellulose were mixed, and the mixture was mixed with water to prepare a negative electrode mixture slurry. The slurry was applied on both surfaces of a copper foil serving as the negative electrode core, to form a negative electrode active material mixture layer. Then, the negative electrode active material mixture layer was compressed by a compression roller, to obtain a negative electrode plate.

[Production of Non-Aqueous Electrolytic Solution]

Ethylene carbonate, ethylmethyl carbonate, and dimethyl carbonate were mixed in a volume ratio of 30:30:40. $LiPF_6$ was dissolved in the mixture solvent, to obtain a non-aqueous electrolytic solution.

[Production of Prismatic Secondary Battery]

A positive electrode electricity collector structure was attached to the above-described positive electrode plate, a negative electrode electricity collector structure was attached to the above-described negative electrode plate, and the positive electrode plate and the negative electrode plate were wound in a spiral shape with a separator made of polypropylene therebetween, to produce a flat wound electrode structure. The electrode structure and the above-described non-aqueous electrolytic solution were stored in a prismatic outer structure, the sealing structure and the like forming the current disconnection mechanism were provided to seal the opening of the outer structure and to obtain a prismatic secondary battery A1.

A structure of the prismatic secondary battery A1 including the current disconnection mechanism was as shown in FIGS. 1-5. The first insulation member 34 and the second insulation member 20a were both formed from polypropylene (PP), and the weight reduction percentage at the TG measurement under the below-described measurement conditions was 100%. A shortest distance from the first conductive member 34 to the positive electrode electricity collector structure 16 along the surface of the first insulation member 34 and passing the outer periphery of the first insulation member 34 was 2.7 mm.

Example 2

Figure 8B:
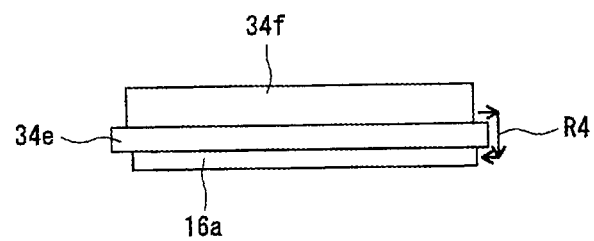
FIG. 8B is a side view of the first insulation member and the first conductive member in the prismatic secondary battery of the alternative configuration.

A prismatic secondary battery A2 was produced by a method similar to Example 1 except that the first conductive member 32 and the first insulation member 34 were changed to the structure shown in FIG. 8 (the inversion plate 33 was also changed to a shape corresponding to the shape of the first conductive member 32). A shortest distance from the first conductive member 34 to the positive electrode electricity collector structure 16 along the surface of the first insulation member 34 and passing the outer periphery of the first insulation member 34 was 2.4 mm.

Comparative Example 1

A prismatic secondary battery B1 was produced by a method similar to Example 1 except that a first insulation member and a second insulation member formed from polyphenylene sulfide (PPS) were used. The weight reduction percentage by TG measurement of the first insulting member and the second insulation member was 60%.

Comparative Example 2

A prismatic secondary battery B2 was produced by a method similar to Comparative Example 1 except that the first conductive member and the first insulation member were changed to the structure shown in FIG. 8 (the inversion plate was also changed to a shape corresponding to the shape of the first conductive member). A shortest distance from the first conductive member to the positive electrode electricity collector structure along the surface of the first insulation member and passing the outer periphery of the first insulation member was 2.4 mm.

[TG Measurement of Insulation Members]

A measurement sample was taken by cutting the first insulation member and the second insulation member of each of the prismatic secondary batteries of the Examples and Comparative Examples, and TG measurement was executing using "TG-DTA apparatus (model no.: Thermo Plus TG8120)" manufactured by RIGAKU under the following measurement conditions:
measurement temperature: 25° C.-600° C.;
temperature increase rate: 5° C./min;
measurement atmosphere: $N_2$ gas flow (0.2 L/min); and
amount of measurement sample: 10 mg.

[Voltage Application Test after Current Disconnection]

For each of the prismatic secondary batteries of the Examples and Comparative Examples, a voltage application test after current disconnection was performed in the following manner:

(1) under a temperature condition of 25° C., CC-CV charging was executed with a constant current of 1 It until the battery voltage reached 4.2V;

(2) CC charging was executed at a constant current of 1 It until the current disconnection mechanisms was activated; and (3) a predetermined voltage shown in TABLE 1 was then applied for 20 seconds.

For each of the prismatic secondary batteries of the Examples and Comparative Examples, presence/absence of spark generation was evaluated by a current value flowing in each prismatic secondary battery when a voltage was applied. The evaluation results are shown in TABLE 1 as ○ (no spark generation) and X (spark generated).

TABLE 1

| Battery | Along-surface shortest distance (mm) | Material of first insulation member | Material of second insulation member | Mass reduction (%) of TG measurement | Applied Voltage: 280 V | Applied Voltage: 400 V | Applied Voltage: 480 V |
|---|---|---|---|---|---|---|---|
| A1 | 2.7 | PP | PP | 100 | ○ | ○ | ○ |
| B1 | 2.7 | PPS | PPS | 60 | X | X | X |
| A2 | 2.4 | PP | PP | 100 | ○ | ○ | ○ |
| B2 | 2.4 | PPS | PPS | 60 | X | X | X |

As shown in TABLE 1, when the along-surface shortest distance was greater than or equal to 2.4 mm and the first insulation member 34 and the second insulation member 20a were formed from a material having a TG weight reduction percentage of 100%, that is, when the first insulation member 34 and the second insulation member 20a were formed from a material which is 100% gasified at about 600° C. (Examples), no spark was generated after the current disconnection mechanism was activated. On the other hand, it was found that, even when the along-surface shortest distance was greater than or equal to 2.4 mm, when the TG weight reduction percentage of the first insulation member and the second insulation member was 60% (Comparative Example), sparks were generated after the current disconnection mechanism was activated.

What is claimed is:
1. A prismatic secondary battery comprising:
an electrode structure including a positive electrode plate and a negative electrode plate;
a prismatic outer structure that has an opening and that stores the electrode structure and an electrolytic solution;
a sealing structure that has a through hole and that seals the opening;

an external terminal that is inserted into the through hole and electrically connected to the electrode structure;

a first conductive member that is placed between the sealing structure and the electrode structure and that has a tubular portion having an opening formed on an end on the electrode structure side;

an inversion plate that seals the opening of the first conductive member;

a second conductive member that is placed on a side closer to the electrode structure than is the inversion plate, and electrically connected to the inversion plate;

a first insulation member that is placed between the inversion plate and the second conductive member; and a second insulation member that is placed between the sealing structure and the first conductive member, wherein a distance from the first conductive member to the second conductive member along a surface of the first insulation member and passing an outer periphery of the first insulation member is greater than or equal to 2.4 mm, at least one of the first insulation member and the second insulation member is formed from a member selected from a group consisting of polypropylene (PP), perfluoroalkoxy fluoroplastic (PFA), and copolymer of ethylene-tetrafluoroethylene (PTFE) that has a weight reduction percentage of 100% at a thermo gravimetric measurement under conditions of a measurement temperature of 25° C.-600° C., a temperature increase rate of 5° C.±0.5° C./min, a measurement atmosphere of an inert gas flow, and an amount of measurement sample of 10 mg±5 mg, and the inversion plate is deformed when a pressure in the prismatic outer structure becomes greater than or equal to a predetermined value, to disconnect a conductive route between the electrode structure and the external terminal.

2. The prismatic secondary battery according to claim 1, wherein the first insulation member comprises a first body placed between the inversion plate and the second conductive member, and a pair of first side wall portions extending from both ends in a width direction of the first body in a direction toward the sealing structure.

3. The prismatic secondary battery according to claim 2, wherein the second insulation member comprises a second body placed between the sealing structure and the first conductive member, and a pair of second side wall portions extending from both ends in a width direction of the second body toward the electrode structure side, and the pair of the first side wall portions and the pair of the second side wall portions are respectively connected to each other.

4. The prismatic secondary battery according to claim 1, wherein a comparative tracking index of the surface of the first insulation member is greater than or equal to 600 V.

5. The prismatic secondary battery according to claim 1, wherein the electrode structure is a flat wound electrode structure in which the positive electrode plate and the negative electrode plate are wound with a separator therebetween, a wound positive electrode core exposing portion is formed on one end in a winding axis direction of the wound electrode structure, a wound negative electrode core exposing portion is formed on the other end in the winding axis direction of the wound electrode structure, a positive electrode electricity collector structure is connected to the wound positive electrode core exposing portion, a negative electrode electricity collector structure is connected to the wound negative electrode core exposing portion, and the second conductive member is at least one of the positive electrode electricity collector structure and the negative electrode electricity collector structure.

6. The prismatic secondary battery according to claim 1, wherein the first conductive member has a circular shape in a plan view.

7. A battery pack in which 50 or more of the prismatic secondary batteries according to claim 1 are connected in series, wherein the prismatic secondary battery is a non-aqueous electrolytic secondary battery.

8. A prismatic secondary battery comprising:

an electrode structure including a positive electrode plate and a negative electrode plate;

a prismatic outer structure that has an opening and that stores the electrode structure and an electrolytic solution;

a sealing structure that has a through hole and that seals the opening;

an external terminal that is inserted into the through hole and electrically connected to the electrode structure;

a first conductive member that is placed between the sealing structure and the electrode structure and that has a tubular portion having an opening formed on an end on the electrode structure side;

an inversion plate that seals the opening of the first conductive member;

a second conductive member that is placed on a side closer to the electrode structure than is the inversion plate, and electrically connected to the inversion plate;

a first insulation member that is placed between the inversion plate and the second conductive member; and a second insulation member that is placed between the sealing structure and the first conductive member, wherein a distance from the first conductive member to the second conductive member along a surface of the first insulation member and passing an outer periphery of the first insulation member is greater than or equal to 2.4 mm, the first insulation member is formed from a member selected from a group consisting of polypropylene (PP), perfluoroalkoxy fluoroplastic (PFA), and copolymer of ethylene-tetrafluoroethylene (PTFE) that has a weight reduction percentage of 100% at a thermo gravimetric measurement under conditions of a measurement temperature of 25° C.-600° C., a temperature increase rate of 5° C.±0.5° C./min, a measurement atmosphere of an inert gas flow, and an amount of measurement sample of 10 mg±5 mg, the second insulation member is formed from a member selected from a group consisting of polypropylene (PP), perfluoroalkoxy fluoroplastic (PFA), and copolymer of ethylene-tetrafluoroethylene (PTFE) that has a weight reduction percentage of 100% at a thermo gravimetric measurement under conditions of a measurement temperature of 25° C.-600° C., a temperature increase rate of 5° C.±0.5° C./min, a measurement atmosphere of an inert gas flow, and an amount of measurement sample of 10 mg±5 mg, and the inversion plate is deformed when a pressure in the prismatic outer structure becomes greater than or equal to a predetermined value, to disconnect a conductive route between the electrode structure and the external terminal.

9. The prismatic secondary battery according to claim 8, wherein the first insulation member comprises a first body placed between the inversion plate and the second conductive member, and a pair of first side wall portions extending from both ends in a width direction of the first body in a direction toward the sealing structure.

10. The prismatic secondary battery according to claim 9, wherein the second insulation member comprises a second body placed between the sealing structure and the first conductive member, and a pair of second side wall portions extending from both ends in a width direction of the second body toward the electrode structure side, and the pair of the first side wall portions and the pair of the second side wall portions are respectively connected to each other.

11. The prismatic secondary battery according to claim 8, wherein a comparative tracking index of the surface of the first insulation member is greater than or equal to 600 V.

12. The prismatic secondary battery according to claim 8, wherein the electrode structure is a flat wound electrode structure in which the positive electrode plate and the negative electrode plate are wound with a separator therebetween, a wound positive electrode core exposing portion is formed on one end in a winding axis direction of the wound electrode structure, a wound negative electrode core exposing portion is formed on the other end in the winding axis direction of the wound electrode structure, a positive electrode electricity collector structure is connected to the wound positive electrode core exposing portion, a negative electrode electricity collector structure is connected to the wound negative electrode core exposing portion, and the second conductive member is at least one of the positive electrode electricity collector structure and the negative electrode electricity collector structure.

13. The prismatic secondary battery according to claim 8, wherein the first conductive member has a circular shape in a plan view.

14. A battery pack in which 50 or more of the prismatic secondary batteries according to claim 8 are connected in series, wherein the prismatic secondary battery is a non-aqueous electrolytic secondary battery.

* * * * *